United States Patent [19]

Leiber

[11] 4,346,943
[45] Aug. 31, 1982

[54] ANTI-LOCKING APPARATUS

[75] Inventor: Heinz Leiber, Leimen, Fed. Rep. of Germany

[73] Assignee: Robert Bosch GmbH, Stuttgart, Fed. Rep. of Germany

[21] Appl. No.: 132,057

[22] Filed: Mar. 20, 1980

[30] Foreign Application Priority Data

Apr. 19, 1979 [DE] Fed. Rep. of Germany ....... 2915821

[51] Int. Cl.³ ............................................... B60T 8/04
[52] U.S. Cl. ..................................... 303/119; 303/92; 303/114
[58] Field of Search ......................... 303/92, 114–117, 303/119

[56] References Cited

U.S. PATENT DOCUMENTS

| | | | |
|---|---|---|---|
| 3,639,009 | 2/1972 | Klein et al. | 303/119 |
| 3,731,979 | 5/1973 | Mikaila | 303/119 |
| 3,874,742 | 4/1975 | Takayama | 303/114 |
| 4,111,496 | 9/1978 | Leiber | 303/114 X |
| 4,231,620 | 11/1980 | Leiber | 303/116 X |

Primary Examiner—Duane A. Reger
Attorney, Agent, or Firm—Edwin E. Greigg

[57] ABSTRACT

An anti-locking apparatus is proposed which is intended for a hydraulic brake system having a foot-actuated brake control valve and is intended for use in passenger vehicles. The brake control valve permits pressure medium to flow from a pressure source to the primary side of a hydraulic main cylinder, which is associated with a central switching valve embodied as a 3/2-way valve and at least one 2/2-way valve for the purpose of controlling the anti-locking function. The secondary side of the main cylinder, or in two-brake circuits, the main cylinders, is associated with a check valve device by way of which the secondary side can be relieved when the check valve device is opened after the switchover of the central switching valve. In this manner, the functioning of the anti-locking apparatus is improved because it is possible to perform the pressure reduction down to the level of atmospheric pressure. This is important at low road adhesion values.

16 Claims, 4 Drawing Figures

4,346,943

ANTI-LOCKING APPARATUS

BACKGROUND OF THE INVENTION

The invention relates to an anti-locking apparatus. An apparatus of this kind is known, see for example, German Offenl. 25 31 016 which corresponds to U.S. application Ser. No. 702,922 filed July 6, 1976; and to British patent No. 1,560,886.

In this known apparatus, the main brake cylinder piston is used for the purpose of pressure modulation. Integrated brake force amplifiers are also known which function with a travel-limiting spring, a brake valve and the associated hydraulic energy supply. When the energy supply is intact, the brake pedal push rod can perform an idle stroke corresponding to the stroke of the travel path simulator, until it comes into contact with the main brake cylinder piston.

This is necessary so that pressure modulation for the anti-locking function is possible over the entire pressure range.

The system disclosed hereafter may also be used in an external force brake in which the brake pressure only reaches the brakes through a valve. The German Patent No. 839,451 discloses a typical external force brake.

OBJECT AND SUMMARY OF THE INVENTION

The anti-locking apparatus according to the invention has the advantage over the prior art that it is embodied substantially more simply. Thus, the number of switching valves and auxiliary elements and auxiliary pistons has been significantly reduced. Furthermore, the subject of the invention is very reliable, that is, it is unlikely to fail, because there are so few parts used. Also, if there is a defect in the switchover valve or if the brake valve locks, a remnant brake effect is always assured at the level of the legally prescribed values. It is finally also advantageous that when the anti-locking means is functioning, the pressure level can be reduced down to the level of atmospheric pressure, which is important at low values for road adhesion. By means of switching a safety valve parallel with the switching valve, the entire braking affect is assured in the case of an interruption of the switching valve or if it is triggered after a short time.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
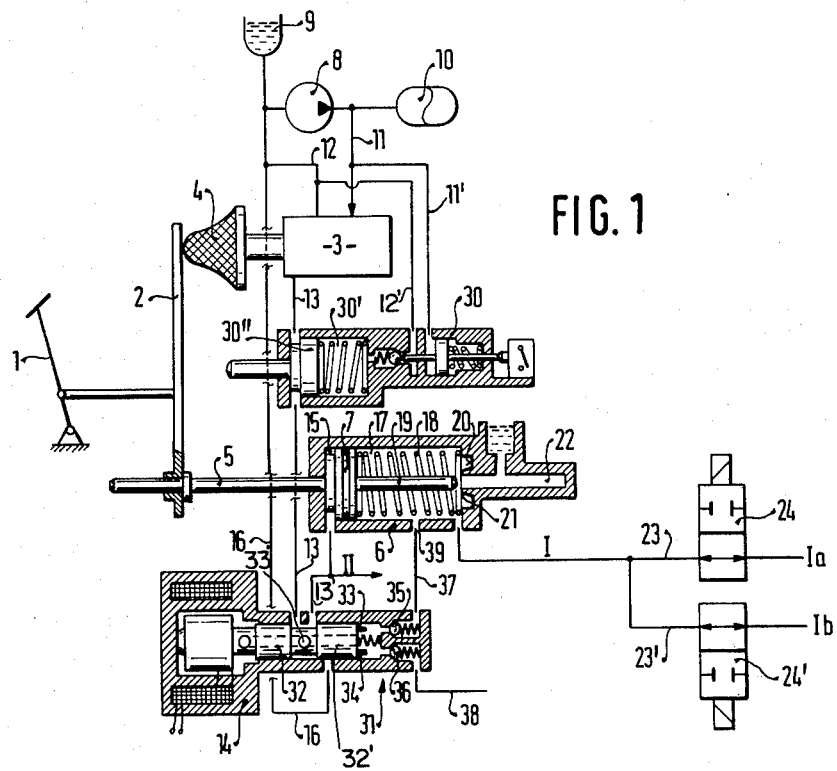
FIG. 1 shows schmetically, a first exemplary embodiment of the anti-locking apparatus.

Turning now to the drawings, an anti-locking apparatus has a brake pedal 1, which acts via a plate 2 both on a travel-limiting spring 4 which precedes a brake control valve 3 and on a push rod 5 of a piston 7 which is movable in a hydraulically actuated main cylinder 6.

The brake control valve 3 and main cylinder 6 are disposed in parallel. A pump 8 furnishing auxiliary force communicates both with a reservoir 9 and with a reservoir 10, and a pressure line 11 leads from these elements to the brake valve 3 and via a branch line 11' to a switchover valve 30, which is also disposed parallel with the brake valve 3. The switch- over valve 30 is a two-position valve, which can be switched over in accordance with the reservoir pressure; that is, when there is pressure in the reservoir, the switchover valve 30 is in the illustrated position, where it interrupts the line, and when the reservoir pressure fails, the switchover valve 30 provides a connection between a pressure chamber 30' and a relief line 12', as a result of which an arresting piston 30" can move into the switchover valve 30.

Leading away from the brake control valve 3 are both the relief line 12 to the reservoir 9 and a control line 13. The control line 13 leads via an electromagnetically actuatable central switching valve 14, which is embodied as a 3/2-way valve, to a primary chamber 15 in the main cylinder 6 via a line 13'. The central switching valve 14 also communicates with the reservoir 9 via a relief line 16.

The main cylinder piston 7 defines within the main cylinder 6 the primary chamber 15 on one side and a secondary chamber 17 on the other, in which a restoring spring 18 for the piston 7 and the piston rod 19 are disposed. A ring seal which separates a refill chamber 22 from the secondary chamber 17 whenever the rod 19 is forced against the ring seal 21 is provided on the base 20 of the secondary chamber 17. The secondary chamber 17 is connected via two brake lines 23, 23' to brake cylinders, not shown, of a closed brake circuit I and in each of these brake lines 23, 23' 2/2-way valves 24, 24' are inserted, with which the pressure in this brake line can be blocked in order to limit the pressure. The 3/2-way switching valve 14 and the 2/2-way valves 24, 24' can be combined into one multiple position valve unit.

Connected to the control line 13' is also a further brake circuit II, also closed, and not shown, having its own main cylinder and its own 2/2-way valves. This brake circuit II is monitored as well by the central switching valve 14.

The central switching valve 14 is provided with a check valve device 31, which can be actuated by a magnetically actuated slide 32 of the switching valve 14 into its switchover position. To this end, the slide 32 has two push rods 33 and 34.

The check valve device 31 has a check valve 35 and 36 in each brake circuit I and II which are is inserted into a return line 37 and 38, respectively, which lead back via the slide 32 from the secondary chamber 17 of each main cylinder 6 to the relief line 16 via a bore 32' and aperture 33' which meets with the bore.

Each return line 37 and 38 begins at the main cylinder 6 at a point 39 which is traversed by the piston 7 after it has performed approximately half its stroke and is thus closed; that is, each return line 37 or 38 is open only at relatively low brake pressures.

The supply containers for the two main cylinders communicate with one another via an overflow means.

Mode of Operation

Upon the actuation of the brakes, the force transmitted by the brake pedal 1 onto the travel-limiting spring 4 is exerted upon the brake control valve 3, which assures that the pressure is transmitted in proportion with the pedal force. The control pressure directed by the brake control valve 3 proceeds via the control line 13 into the central switching valve 14 and from there passes to the primary side of the main brake cylinder piston 7. As a result of this exertion of force, the two main brake cylinder pistons move toward the right, which result in a corresponding pressure increase in the closed brake circuits I and II via the 2/2-way magnetic valves 24, 24'. The switchover valve 30 is normally closed; that is, it is closed when there is sufficient reservoir pressure available.

At a normal relative setting between the travel-limiting spring 4 and the main cylinder piston 7, the main cylinder pistons travel farther than the corresponding path of the travel-limiting spring 4. A mode of operation of this kind has already been described in the German application, P 27 50 491.2 which corresponds to U.S. Pat. No. 4,197,710.

If an appropriate actuation of the pedal 1 establishes a pressure which exceeds the locking pressure, then a pressure reduction is necessary. If this is the case, for instance in brake circuit Ib, the central switching valve 14 and the 2/2-way valve 24' are triggered electrically. The slide 32 in the central switching valve 14 moves toward the right and blocks the control line 13. After the slide 32 has traveled farther, it connects the part of the control line 13' belonging to the main cylinder with the relief line 16. The result is a pressure reduction in the primary chamber 15.

Finally, the push rods 33 and 34 push the check valves 35 and 36 open, which causes a discharge of pressure medium from the secondary chamber 17 of the main cylinders via the bore 32' and aperture 33' to the relief line 16, whenever the main cylinder pistons are still in the first half of their stroke. In this manner, the pressure level can be reduced down to the level of atmospheric pressure, which is advantageous at low values for road adhesion.

If it is intended to reduce the pressure in both wheel brake channels Ia and Ib, then the 2/2-way valves located on the secondary side are not actuated. This is because a lowering of the pressure in the wheel cylinders is only possible if the valves 24, 24' assume their flow through position and if the 3/2 way valve 14 is positioned on release, i.e., in its right end position. However, if pressure reduction is necessary only on one wheel, then the corresponding 2/2-way valves 24 and 24' switches over to the pressure maintenance function in its second position.

If the auxiliary energy fails, then the pressure holding switchover valve 30 to the right is relieved and the switchover valve 30 switches into its other position, in which its valve opens and connects the pressure chamber 30' with the return line 12'. The force of the brake pedal 1, unhindered by the arresting piston 30'' due to release of the pressure in chamber 30', is then directed via the plate 2 and the push rod 5 onto the main cylinder pistons, which then in a conventional manner causes a pressure increase in the closed brake circuits I and II due to the main pistons moving to the right. Thus, the anti-locking function is switched off.

Figure 2:
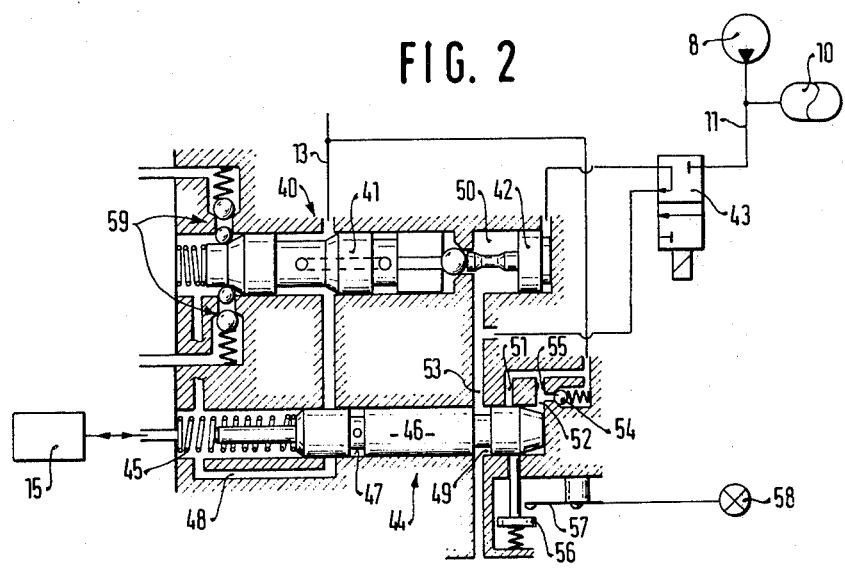
FIG. 2 shows another schematic representation of a different embodiment with a specialized safety valve.

The alternative shown in FIG. 2 illustrates a central switching valve 40 corresponding to the valve 14. Anticipitory control of a control slide 41 in this central switching valve 40 is affected via a switching piston 42 and an additional 3/2-way valve 43.

A design of this kind has the advantage that is can be arranged less critically with respect to the balance of forces, because of the anticipitory control via the switching piston 42 with appropriate displacement force. Also, the course of control of time can be varied within certain limits. In this case, a check valve 59 is attached to the central switching valve 40 in such a way that its valves can be actuated radially.

A safety valve 44 is switched parallel to the central switching valve 40 and provides security in the event that the slide 41 is blocked in its switchover position; this blockage may come about because the power output stage of the electronic switching device, not shown, no longer switches off the electrical current, or the slide 41 may seize as a result of soiling or the like. Should this happen, the result would be that no pressure increase could be brought about in the main cylinder 6, because in such a case, the control pressure would be zero since the slide 41 has connected the main cylinder primary chamber 15 to the relief line 16.

The safety valve 44 responds to a pressure difference between the portions of the control line 13 located before and after the switching valve 40. A pressure difference of this kind is brought about during each control cycle.

The safety valve 44 has a slide 46 under the influence of a spring 45. The slide 46 on one side, with an annular recess 47, provides connection of the control line 13 with a return line 48 and on the other side, with a portion 49, it monitors a connection between a chamber 50 defined by the switching piston 42 and a control line 13 or the relief line 16. To this end channels 51, 52 and 53 and a check valve 54 and a throttle 55 are provided in the region of the element 49. Finally, a detent device 56 cooperates with the safety valve 44, by means of which the safety valve can be fixed in the switchover position. The detent device 56 has a switching contact 57 for a warning light 58. The other portions of the anti-locking apparatus correspond to those already discussed in connection with FIG. 1.

Figure 4:
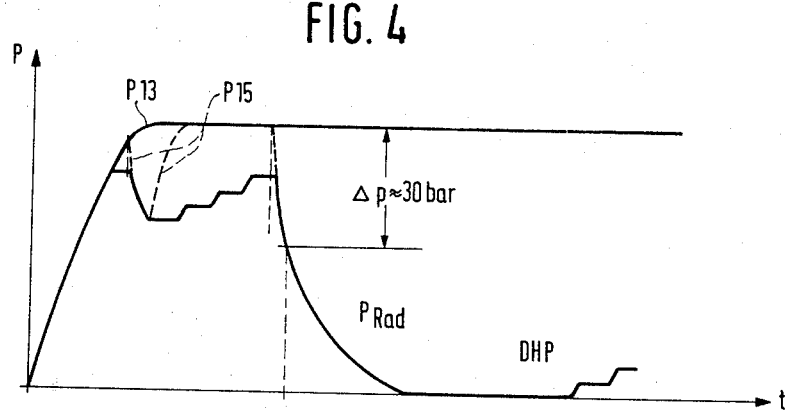
FIG. 4 shows a diagram showing the course taken by the pressure.

With the aid of the diagram of FIG. 4, the function of the anti-locking apparatus shown in FIG. 2 will now be described. In the diagram, the pressure is plotted on the ordinate and the course of the pressure over time is plotted on the abscissa.

In the first phase, the establishment of brake pressure has a normal course. After a particular pressure level has been attained, this pressure is maintained. Now if a command is given via the electronic switching device to increase pressure, then the pressure in the main cylinder primary chamber (P15) drops from a somewhat higher pressure level to a lower level and influences the pressure in the wheel ($P_{Rad}$), when the appropriate pressure level has been attained. Subsequently, the pressure reduction in the wheel takes place as it is measured by the control electronics. After the pressure maintainence phase (DHP), the central switching valve 40 switches over again; the result is that the pressure level in the primary chamber 15 is equal to the pressure level in the control line 13 (P13).

After a cyclical pressure increase, a command is given for pressure reduction. In this case, there is a prolonged trigger time, for instance, such as occurs when there is an abrupt change in road adhesion or frictional connection from high road adhesion values to low road adhesion values. If the corresponding pressure difference between the pressure in the control line 13 and the pressure in the primary chamber 15, which may be 30 bar, is now exceeded, then a delayed movement of the slide 46 occurs via the throttle 55 in the channel 52. If for technical reasons, such as aquaplaning, a longer period is now required for pressure reduction, than the central switching valve 40 is briefly switched back into its outset position and the 2/2-way valves which are intended to maintain the low pressure level in the wheel are simultaneously triggered. During this switching procedure, the slide 46 of the safety valve 44 moves back into the outset position, virtually without any delay in time caused by the restoring spring 45, because the appropriate pressure medium can flow back out via the check valve 54. Now, if there is a failure which prevents the switchover, then the slide 46 travels farther. If the control element 49 of the slide 46 now opens the access to the channel 51, then the throttled access is bridged over via the channel 52; the result is that the slide 46 is moved without a delay into its left-hand end position. This is necessary because when the annular recess 47 has traveled past the control line 13, the pressure difference between P13 and P15 is eliminated. In order to switch on the entire braking affect immediately in the case of failure, the safety valve 44 is arrested via the detent device 56. The failure is conveyed to the electronics via the contact 57 and the warning light 58 is then triggered.

Figure 3:
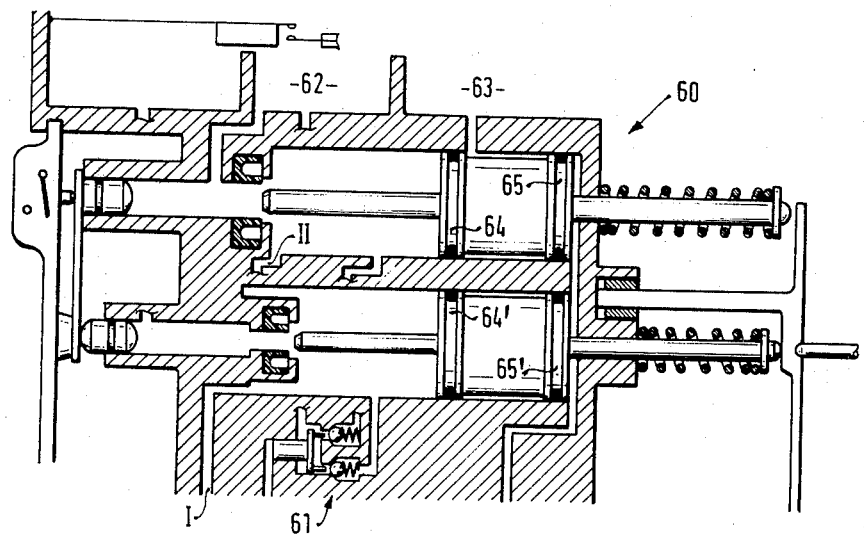
FIG. 3 shows still another schematic view of a further derivation of the apparatus.

FIG. 3, in contrast to FIG. 1, shows an amplifier 60 equipped with two main cylinders in a so-called two-medium system, in which the brake circuits I and II have a different pressure medium from the amplifier pressure medium circuit. Each main cylinder piston carries two sealing rings 64, 65 and 64′, 65′, respectively, in order to separate the pressure mediums. A check valve device is here given reference numeral 61. In this embodiment, when there is anti-locking pressure modulation, the pressure medium is conveyed via the check valve device 61 not via a central switching valve 14 or 40, but rather directly into the supply containers 62, 63 of each brake circuit I and II.

The return line from the check valves can also, in a so-called one-medium system, be carried directly into the appropriate supply container.

So that there is sufficient braking affect in the case of failure, the anti-locking function can occur only when there is sufficient reservoir pressure and sufficient fluid in the supply container.

A switching valve 40 can also be installed in external force systems between the brake valve and the wheel cylinder or the 2/2-way adjustment member. The same is true for the safety valve 44 switched parallel thereto.

The foregoing relates to preferred embodiments of the invention, it being understood that other embodiments and variants thereof are possible within the spirit and scope of the invention, the latter being defined by the appended claims.

What is claimed and desired to be secured by Letters Patent of the United States is:

1. A hydraulic main cylinder including a primary side, a secondary side, and an anti-locking apparatus for a hydraulic brake system including a valve pedal push rod, a foot-actuated brake control valve, a travel-limiting spring secured on said brake control valve, and a pressure source, whereby at least one pressure medium proceeds from said pressure source to the primary side of said hydraulic main cylinder, said hydraulic main cylinder arranged to supply closed brake circuits and further including a check valve device, one 3/2-way switching valve and at least one 2/2-way valve for the purpose of anti-locking pressure modulation, characterized in that said brake circuits are connected via said check valve device with a relief side of the pressure medium source.

2. An anti-locking apparatus as defined by claim 1, characterized in that said check valve device is disposed in a central switching valve.

3. An anti-locking apparatus as defined by claim 2, characterized in that said check valve device is pushed open mechanically during the movement of said central switching valve in order to connect one brake circuit with a relief side of the switching valve.

4. An anti-locking apparatus as defined by claim 1, characterized in that said check valve device is actuatable, preferably directly, by said control slide of a central switching valve.

5. An anti-locking apparatus as defined by claim 1, characterized in that said relief comprises a return line which flows back to said pressure source when a single pressure medium is used.

6. An anti-locking apparatus as defined by claim 1, characterized in that said relief side is a return line leading back to a refill container when two pressure mediums are used and further wherein said main cylinder includes a piston provided with two sealing rings which separate said two mediums.

7. Anti-locking apparatuses as defined by claim 1, having two main cylinders, characterized in that said check valve device has two check valves, one of each of which is assigned to one main cylinder.

8. An anti-locking apparatus as defined by claim 7, characterized in that said check valves are triggerable together.

9. An anti-locking apparatus as defined by claim 7, characterized in that said check valves are separately triggerable.

10. An anti-locking apparatus as defined by claim 8, characterized in that said triggering of the check valve device is fixed when the brake pedal push rod has attained approximately half the maximum stroke.

11. An anti-locking apparatus as defined by claim 1, characterized in that said travel-limiting spring is disposed in parallel relation with said main cylinder and is actuatable by a brake pedal plate which is secured on a piston rod of said main cylinder.

12. An anti-locking apparatus as defined by claim 2, characterized in that said central switching valve further includes a safety valve.

13. An anti-locking apparatus as defined by claim 12, characterized in that said safety valve is switchable, preferably via an anticipatory control valve, in accordance with pressure and further that switching movement of said safety valve in one of two directions is delayed, preferably by a throttle.

14. An anti-locking apparatus as defined by claim 12, characterized in that said safety valve is combined with a detent device for switchover positional movement thereof.

15. An anti-locking apparatus as defined by claim 1, characterized in that said anti-locking apparatus is switched off when there is insufficient reservoir pressure and/or insufficient fluid supply.

16. An anti-locking apparatus as defined by claim 1, characterized in that said 3/2-way switching valve and said 2/2-way valve comprise elements of a multiple position valve unit.

* * * * *